US010958603B2

(12) United States Patent
Yang et al.

(10) Patent No.: US 10,958,603 B2
(45) Date of Patent: Mar. 23, 2021

(54) INSTANT PHOTO SHARING VIA LOCAL AREA NETWORK SETUPS

(71) Applicant: INTERNATIONAL BUSINESS MACHINES CORPORATION, Armonk, NY (US)

(72) Inventors: Kun Yang, Beijing (CN); Zhi Li Guan, Beijing (CN); Huai Ying Xia, Beijing (CN); Xue Yong Zhang, Beijing (CN); Jin Zhang, Beijing (CN); Xi Mei Kong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 16/167,887

(22) Filed: Oct. 23, 2018

(65) Prior Publication Data
US 2020/0127952 A1 Apr. 23, 2020

(51) Int. Cl.
G06F 15/16 (2006.01)
H04L 12/58 (2006.01)
(Continued)

(52) U.S. Cl.
CPC .......... *H04L 51/10* (2013.01); *G06F 21/6254* (2013.01); *G06K 9/00268* (2013.01);
(Continued)

(58) Field of Classification Search
CPC ....... H04L 51/10; H04L 67/06; H04L 67/303; H04W 4/80; H04W 8/005; H04W 12/08; G06F 21/6254; G06K 9/00268
(Continued)

(56) References Cited

U.S. PATENT DOCUMENTS 8,947,547 B1 2/2015 Millikan
2007/0086764 A1* 4/2007 Konicek ................. G10L 17/22
396/56
(Continued)

FOREIGN PATENT DOCUMENTS

CN 103945105 A 7/2014
CN 104317932 A 1/2015
(Continued)

OTHER PUBLICATIONS

Anonymous, "Automatic Real-Time Photo Distribution for Mobil Devices", IP.com. Prior Art Database Technical Disclosure. IPCOM000245318D. Feb. 29, 2016. pp. 1-5.
(Continued)

*Primary Examiner* — Wing F Chan
*Assistant Examiner* — Joseph R Maniwang
(74) *Attorney, Agent, or Firm* — Tutunjian & Bitetto, P.C.; Kurt Goudy

(57) ABSTRACT

A computer-implemented method is presented for enabling instant and automatic photo sharing between computing devices. The method includes allowing a first user to operate a first computing device to create a plurality of images, the plurality of images including physical characteristics of a second user, transmitting a broadcast message to a plurality of second computing devices, determining whether a match occurs between the first computing device and one or more of the plurality of second computing devices, and establishing a local area network between the first computing device and matched second computing devices. The method further includes automatically and instantly transmitting the plurality of images to the matched second computing devices by priority and sequence determinations, and, upon completion of the transmittal of the plurality of images to the matched
(Continued)

second computing devices, terminating the local area network.

20 Claims, 8 Drawing Sheets

(51) Int. Cl.
*H04L 29/08* (2006.01)
*G06F 21/62* (2013.01)
*G06K 9/00* (2006.01)
*H04W 8/00* (2009.01)
*H04W 4/80* (2018.01)
*H04W 12/08* (2021.01)

(52) U.S. Cl.
CPC ........... *H04L 67/06* (2013.01); *H04L 67/303* (2013.01); *H04W 4/80* (2018.02); *H04W 8/005* (2013.01); *H04W 12/08* (2013.01)

(58) Field of Classification Search
USPC ........................................................ 709/232
See application file for complete search history.

(56) References Cited

U.S. PATENT DOCUMENTS

| 2011/0047384 | A1 | 2/2011 | Jacobs et al. |
| 2013/0011025 | A1* | 1/2013 | Liu ........................ H04W 12/04 382/118 |
| 2014/0059231 | A1* | 2/2014 | Choi ................. H04M 1/72583 709/226 |
| 2017/0149863 | A1* | 5/2017 | Chitti ..................... H04L 67/322 |
| 2017/0255820 | A1* | 9/2017 | Liu ..................... G06K 9/00255 |
| 2020/0076876 | A1* | 3/2020 | Zhang ................. G06F 3/04817 |

FOREIGN PATENT DOCUMENTS

| CN | 105025162 A | 11/2015 |
| CN | 105740426 A | 7/2016 |
| WO | 2017197778 A1 | 11/2017 |

OTHER PUBLICATIONS

Jacob Kastrenakes, "Google Photos' new sharing features are starting to roll out", The Verge. https://www.theverge.com/2017/6/28/15886932/google-photos-automatic-sharing-feature-rolling-out. Downloaded Aug. 17, 2018. pp. 1-2.

* cited by examiner

INSTANT PHOTO SHARING VIA LOCAL AREA NETWORK SETUPS

BACKGROUND

Technical Field

The present invention relates generally to the field of digital media, and more specifically, to automatically and instantly sharing images or videos between users, without user intervention.

Description of the Related Art

Countless photographs are taken every day. Many of these photos are shared directly with friends, acquaintances, or family, or published on a website or blog. For example, one social media network reports receipt of hundreds of millions of photos per day from over a billion users. Selecting a photo to share and recipients to share the photo with can be a time consuming task.

SUMMARY

In accordance with an embodiment, a method is provided for enabling instant and automatic photo sharing between computing devices. The method includes allowing a first user to operate a first computing device to create a plurality of images, the plurality of images including physical characteristics of a second user, transmitting a broadcast message to a plurality of second computing devices, determining whether a match occurs between the first computing device and one or more of the plurality of second computing devices, establishing a local area network between the first computing device and matched second computing devices, automatically and instantly transmitting the plurality of images to the matched second computing devices by priority and sequence determinations, and, upon completion of the transmittal of the plurality of images to the matched second computing devices, terminating the local area network.

In accordance with another embodiment, a system is provided for enabling instant and automatic photo sharing between computing devices. The system includes a first computing device operated by a first user to create a plurality of images, the plurality of images including physical characteristics of a second user, a plurality of second computing devices to receive a broadcast message transmitted from the first computing device, a matching module to determine whether a match occurs between the first computing device and one or more of the plurality of second computing devices, and a local area network established between the first computing device and matched second computing devices, wherein the plurality of images are automatically and instantly transmitted to the matched second computing devices by priority and sequence determinations, and, upon completion of the transmittal of the plurality of images to the matched second computing devices, the local area network is terminated.

In accordance with yet another embodiment, a non-transitory computer-readable storage medium comprising a computer-readable program for enabling instant and automatic photo sharing between computing devices is presented. The non-transitory computer-readable storage medium performs the steps of allowing a first user to operate a first computing device to create a plurality of images, the plurality of images including physical characteristics of a second user, transmitting a broadcast message to a plurality of second computing devices, determining whether a match occurs between the first computing device and one or more of the plurality of second computing devices, establishing a local area network between the first computing device and matched second computing devices, automatically and instantly transmitting the plurality of images to the matched second computing devices by priority and sequence determinations, and, upon completion of the transmittal of the plurality of images to the matched second computing devices, terminating the local area network.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein.

DETAILED DESCRIPTION

Embodiments in accordance with the present invention provide methods and devices for instantly sharing photos or images or videos or other data between users. Greater than 90% of today's pictures that are taken are "lost" as not shared or uploaded (and lost with them is a great deal of potentially valuable data). There are many reasons for this. For instance, it is cumbersome to share photos from a certain event or general circumstance with others who also took part in those moments and current solutions require pre-inviting others to join group albums or creating static lists and/or circles. There is no way to perform this task automatically. Requesting others to share photos after the event is often an irritating request for all parties and the multitude of work-around solutions means most photos are not shared before they are superseded by new photos.

Embodiments in accordance with the present invention provide methods and devices for creating temporary local area networks between a user taking a photo and the person in the photo. A match is determined between the electronic devices of the person taking the photo and the person in the photo. The verification of the match enables the automatic and instant transmission of the photos taken by the person, in real-time, to the electronic device of the person in the photos.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Figure 1:
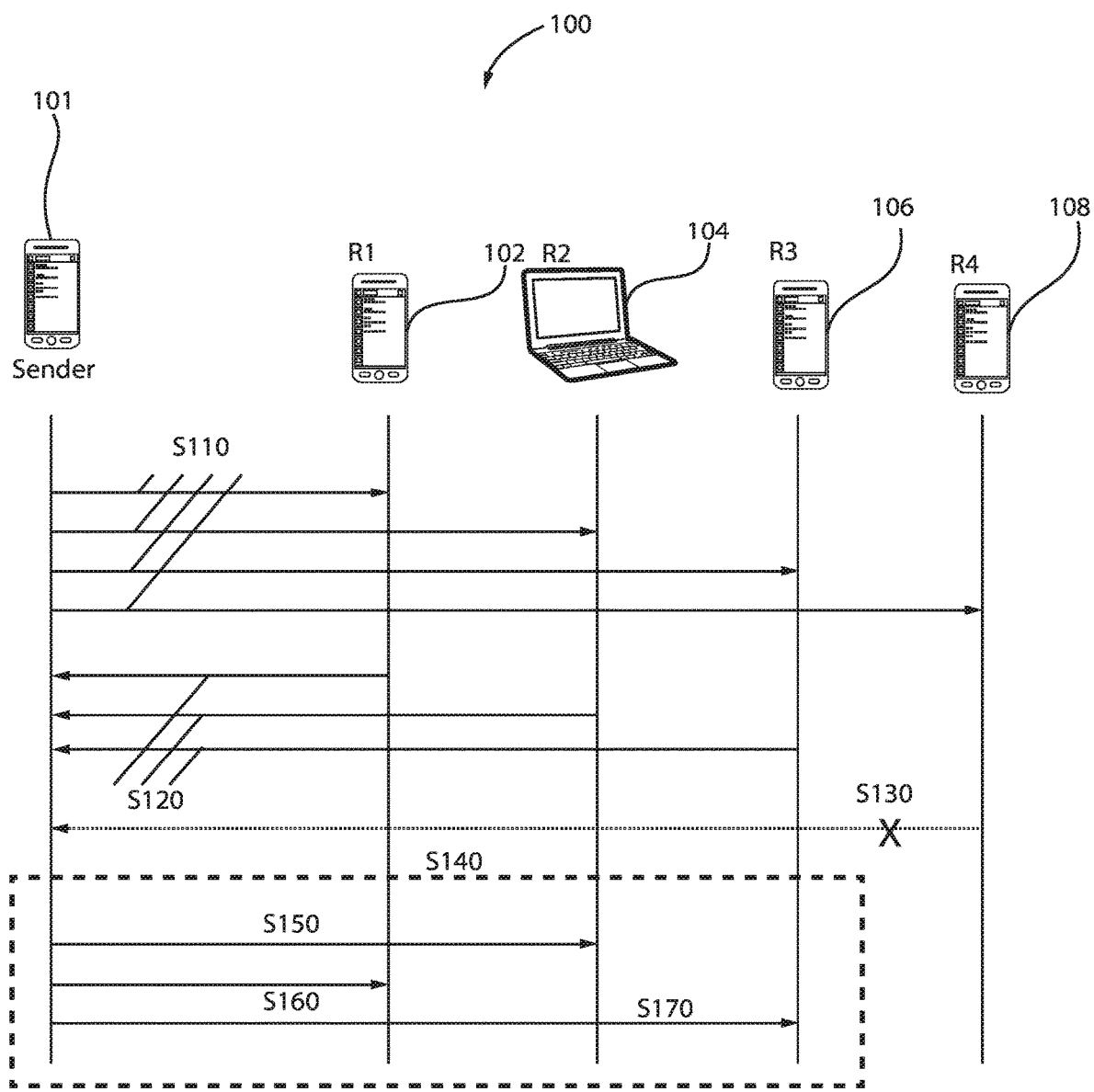
FIG. 1 is a block/flow diagram of a communication network for employing Bluetooth® to set up a point-to-point local area network (LAN), in accordance with embodiments of the present invention.

FIG. 1 is a block/flow diagram of a communication network for employing Bluetooth® to set up a point-to-point local area network (LAN), in accordance with embodiments of the present invention.

Digital cameras have become a widespread tool for capturing photographs and videos. It is common for a user to own and use multiple digital cameras, such as a camera integrated into a mobile phone, a webcam attached to a home computer, a point-and-shoot camera, and a digital single-lens reflex (DSLR) camera. It is also common for multiple users attending the same event to take photos and videos of the event from different angles and at different times. As a result, related photos and videos are saved to storage devices on many different cameras, mobile phones, and computers, and it is difficult and inconvenient for users to organize these photos and videos and share them with each other. The present invention allows users to automatically and instantly share photos or images or videos or general data with other users in real-time, without user intervention, and without the need for employing servers or external storage devices.

Sequence diagram 100 includes a sender 101 and a plurality of receivers 102 (R1), 104 (R2), 106 (R3), 108 (R4). The sender can be an electronic device 101. Similarly, the plurality of receivers 102, 104, 106, 108 can be electronic devices. The electronic devices can be portable or non-portable electronic devices that have photo sharing capabilities. For example, the electronic devices can be smart phones or laptops or tablets or other similar electronic devices or computing devices having photo-sharing capabilities.

The sender 101 can transmit a Bluetooth® broadcast message S110 to all of the plurality of receivers 102, 104, 106, 108. Bluetooth is a wireless technology standard for exchanging data over short distances (e.g., using short-wavelength UHF radio waves in the ISM band from 2.400 to 2.485 GHz) from, e.g., mobile devices, and building personal area networks (PANs).

The broadcast message S110 can include identification (ID), such as a phone number, an encrypted ID, and a facial feature. The broadcast message S110 is received by all of the receivers 102, 104, 106, 108. Each of the receivers 102, 104, 106, 108 determines whether there is a match (via a matching module) and sends a response to the sender 101. For instance, the match can relate to a phone number match or a facial feature match or an encrypted facial feature match. In the instance case, a match has been verified for devices 102, 104, 106. No match has been found for device 108. As such, devices 102, 104, 106 send a response signal S120 to the sender 101, whereas device 108 sends a response signal S130 to the sender 101. Thus, the Bluetooth® message was matched by three out of the four computing devices within a certain vicinity or proximity to the sender 101.

Since a match has been determined with three of the receivers 102, 104, 106, data can now be sent to the receivers 102, 104, 106. First, a local area network (LAN) is established between the sender 101 and the receivers 102, 104, 106 (where a match has been confirmed). Second, after the LAN has been established, the system needs to determine data send priority and sequence to send signal S140. In other words, which receiver will get the data first, which will get the data second, and which will get the data third. In the instant case, the data signal S150 is sent sequentially first to device 104, then signal S160 is sent to device 102, and then signal S170 is sent to device 106.

Figure 2:
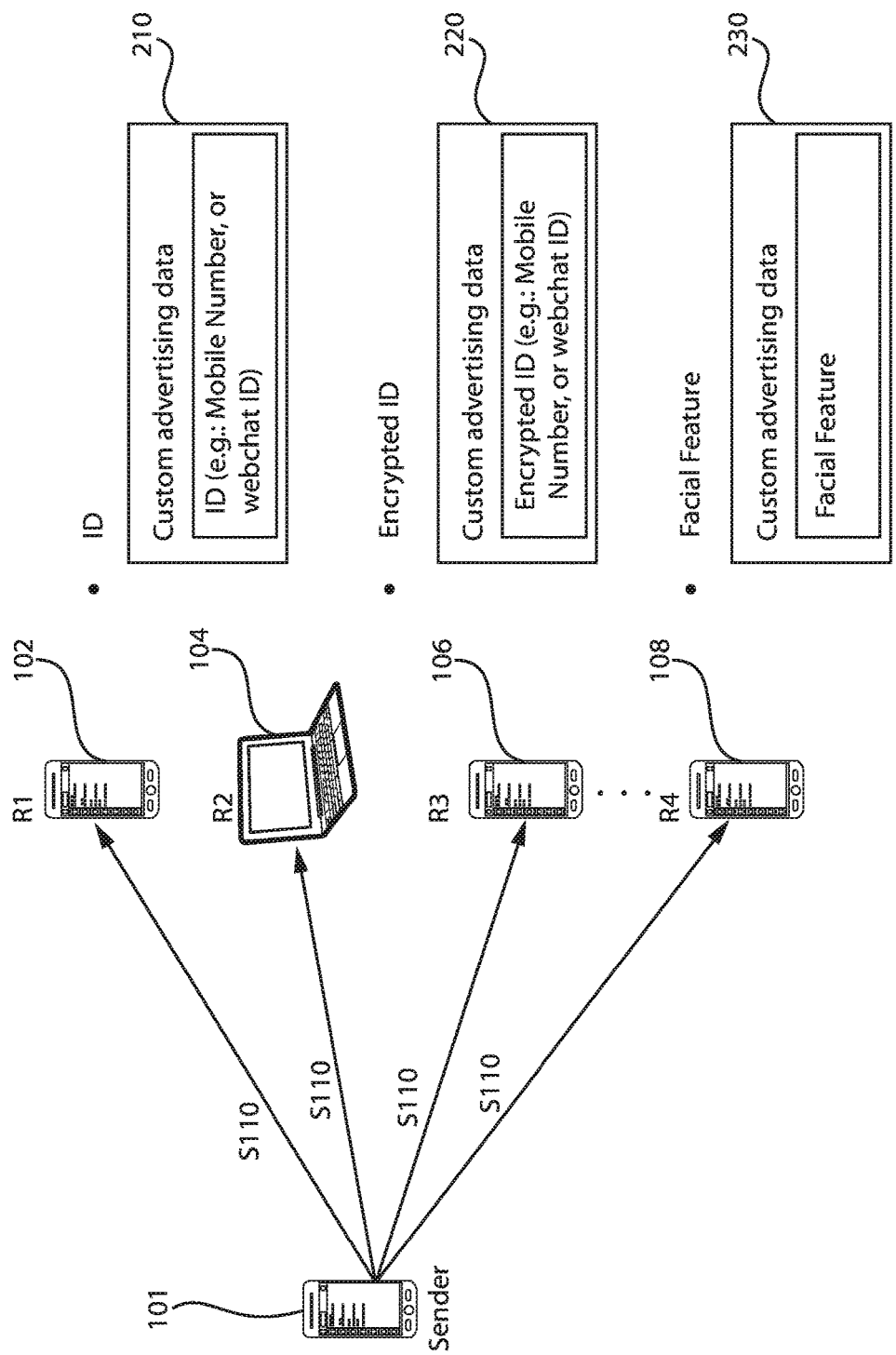
FIG. 2 is a block/flow diagram of an exemplary transmission block for transmitting a Bluetooth® broadcast message, in accordance with an embodiment of the present invention.

FIG. 2 is a block/flow diagram of an exemplary transmission block for transmitting a Bluetooth® broadcast message, in accordance with an embodiment of the present invention.

A match can be determined based on ID data 210, encrypted ID data 220, and facial features 230. The ID data 210 and the encrypted ID data 220 can include, e.g., mobile numbers, webchat IDs, etc. After the message S110 is broadcast, the receivers 102, 104, 106, 108 respond with a receive data rate (V) that is impacted by transmitter output powers and distance. The sender 101 then calculates the priority and sequence (P) based on one or more of the following factors: response time (T), receive data rate (V), and send data size (S).

The formula can be calculated as follows:

$T_1 < T_2: P_1 > P_2$ $T_1 = T_2$:

If $V_1 > V_2: P_1 > P_2$ else $V_1 < V_2: P_1 < P_2$ else $V_1 = V_2$: randomly The priority and sequence diagram can be given as:

| . . . | . . . |
|---|---|
| 3 | S->R3 |

| 2 | S->R1 |
| 1 | S->R2 |

Then the sender 101 sends data to the receivers 102, 104, 106.

Based on the sequence calculated above, the data is sent sequentially as follows:

Sender sends data to R2, and disconnects connection automatically once finished sending the data. Sender sends data to R1, and disconnects connection automatically once finished sending the data. R1 sends data to R3 simultaneously, and disconnects connection automatically once finished sending the data.

Figure 3:
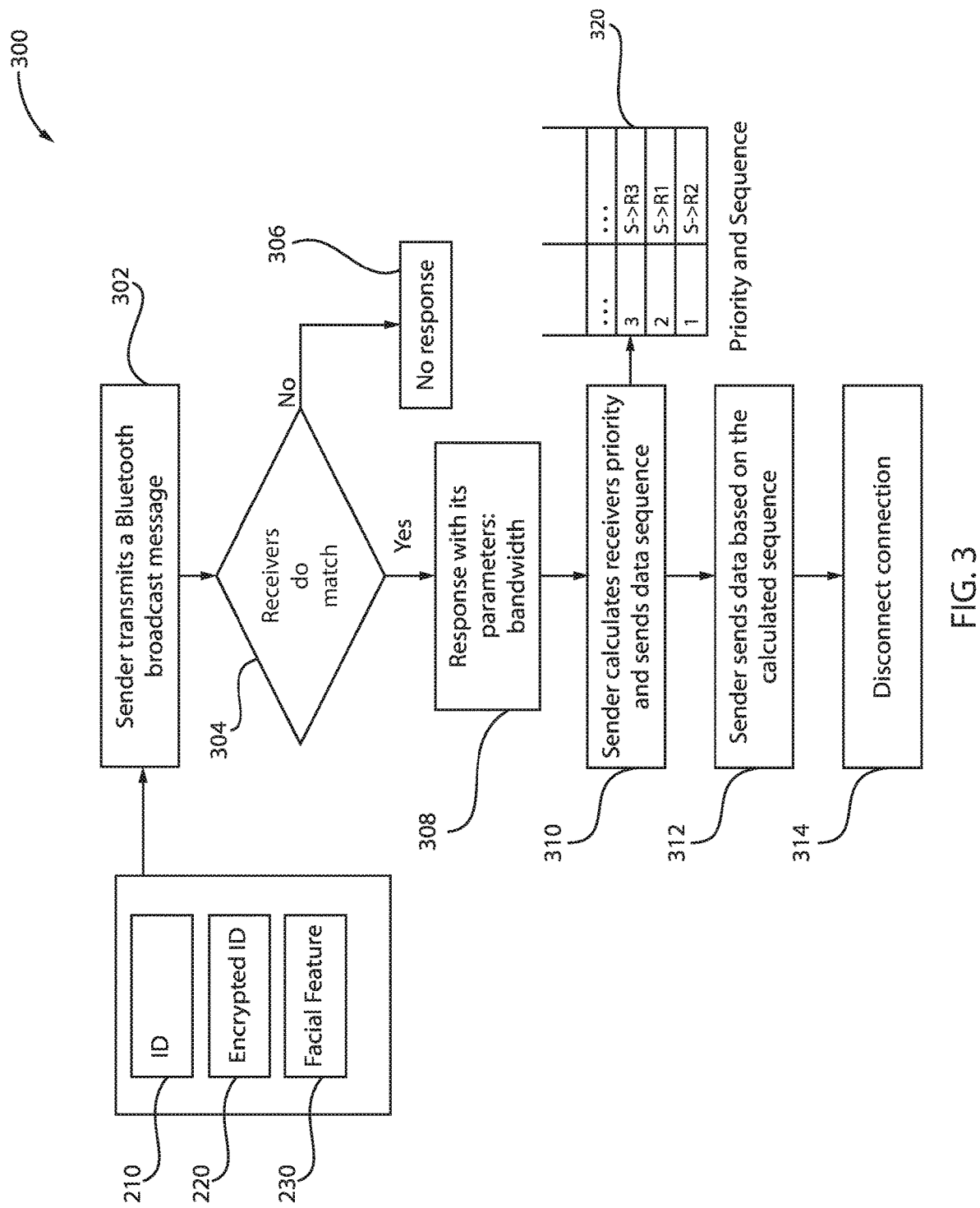
FIG. 3 is a block/flow diagram of an exemplary flowchart for embedding receiver's information in a Bluetooth® broadcast to employ Bluetooth® to set up the point-to-point LAN, in accordance with an embodiment of the present invention.

FIG. 3 is a block/flow diagram of an exemplary flowchart 300 for embedding receiver's information in a Bluetooth® broadcast to employ Bluetooth® to set up the point-to-point LAN, in accordance with an embodiment of the present invention.

At block 302, the sender 101 transmits a Bluetooth® broadcast message. The message can be transmitted based on a match between the sender 101 and one or more receivers 102, 104, 106, 108. The match can be determined based on ID information 210, encrypted ID information 220, and facial feature information 230.

At block 304, it is determined whether there is a match between the receivers 102, 104, 106, 108 and the sender 101. If no match is determined, the process flows to block 306. No match has been determined for receiver 108. If a match is determined the process proceeds to block 308.

At block 308, since a match has been determined for receivers 102, 104, 106, such receivers communicate with the sender 101 by transmitting a parameter, such as bandwidth.

At block 310, the sender 101 calculates the receiver priority and sends a data sequence 320. In the instant case, the data sequence is as follows: R2, R1, R3. In other words, receiver R2 has first priority, receiver R1 has second priority, and receiver R3 has third priority.

At block 312, the sender 101 sends data to the receivers 102, 104, 106 based on the calculated sequence.

At block 314, the connection between the sender 101 and the receivers 102, 104, 106, 108 is disconnected.

Therefore, according to a first embodiment, and with reference to FIG. 3, embedding receiver's information in Bluetooth® broadcast is employed to achieve a Bluetooth® setup of a point-to-point small LAN, thereby propagating data, not limited to photos, including various data, safely and conveniently.

Figure 4:
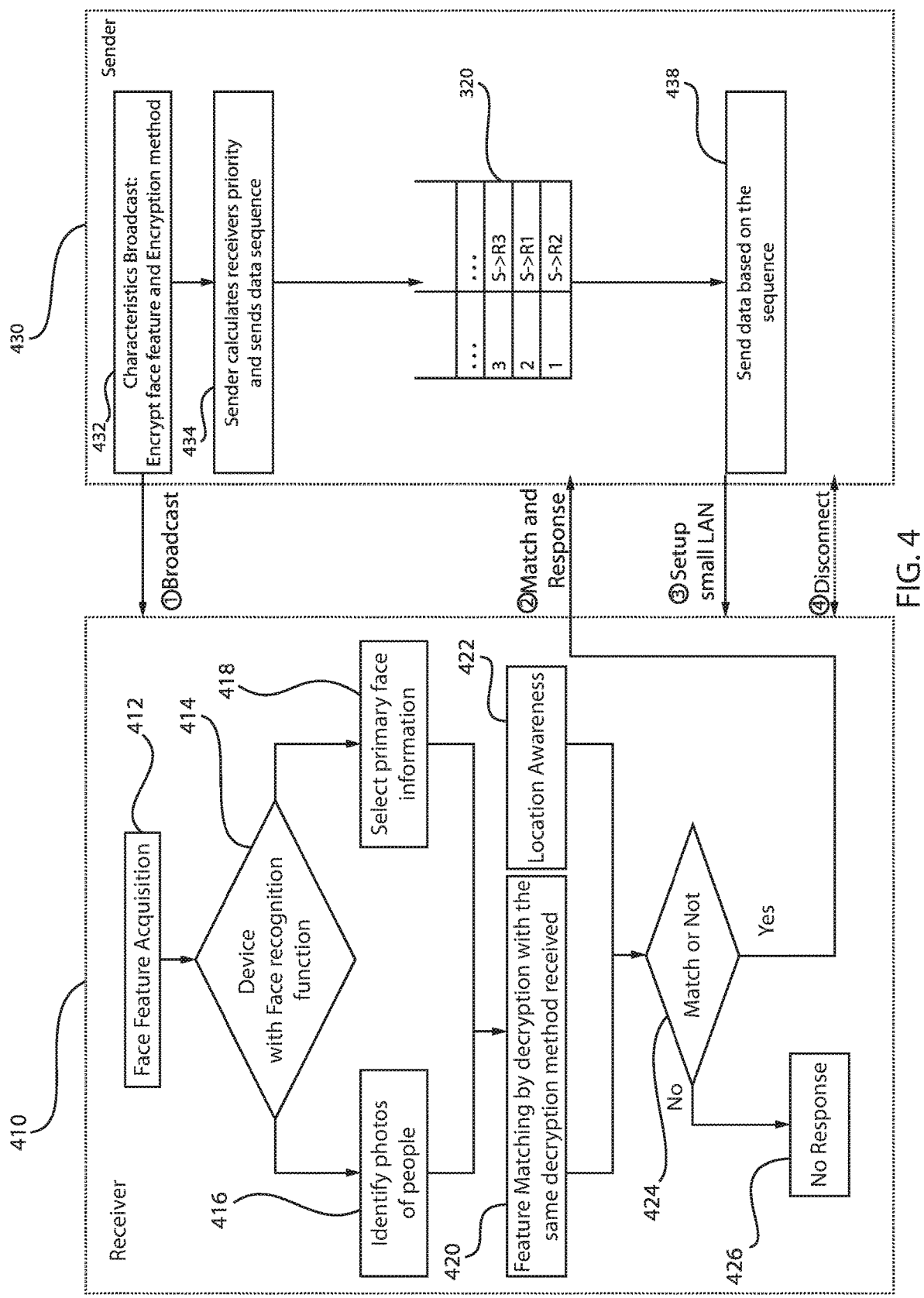
FIG. 4 is a block/flow diagram of an exemplary flowchart for broadcasting facial feature information by employing Bluetooth® to set up the point-to-point LAN, in accordance with an embodiment of the present invention.

FIG. 4 is a block/flow diagram of an exemplary flowchart for broadcasting facial feature information by employing Bluetooth® to set up the point-to-point LAN, in accordance with an embodiment of the present invention.

According to a second embodiment, and with reference to FIG. 4, the face feature information is broadcasted by using Bluetooth® to setup a small LAN, and then the matched photo data is transmitted automatically, instantly, and in real-time.

Thus, in the second embodiment, once a user takes a photo of an individual, such photo is automatically shared with such individual. The face feature information is broadcast by employing Bluetooth® to setup a small local area network, and then the matched photo data is transmitted automatically, instantly, and in real-time. The method includes broadcasting encryption facial feature information by a photographer's device, calculating the face-feature using the same encryption algorithm that performs the matches, calculating a send order by the sender, and sending the matched photos to the photographed person automatically in the peer-to-peer LAN.

Block 410 describes the receiver processing and block 430 describes the sender processing.

Receiver Processing:

At block 412, a facial feature image 412 is acquired.

At block 414, it is determined whether the device includes facial feature recognition functions.

At block 416, photos of people are identified.

At block 418, primary facial information is selected.

At block 420, feature matching is performed by decryption by employing the same encryption method with the received images.

At block 422 location awareness is also optionally determined.

At block 424, it is determined whether a match exists. If NO, then the process proceeds to block 426 where no response is provided. If YES, the process proceeds to the sender processing 430.

Sender Processing:

At block 432, the sender broadcasts a message to the receiver. The broadcast can be a characteristics broadcast. The characteristics broadcast can include encrypted facial features that are encrypted by an encryption method.

At block 434, the sender calculates the receivers priority and sends a data sequence.

The priority can be given by the data sequence 320. The data 438 based on the data sequence 320 is sent back to the receiver.

Therefore, in summary, a broadcast message is transmitted to the receiver from the sender. The receiver determines whether there is a match and sends a response to the sender. If a match occurs, a LAN is set up for the sender and the matched receivers. Data is then transferred from the sender to the matched receivers. Once all the data is sent to the receivers based on priority and data sequence, the sender is disconnected from the matched receivers. Thus, a temporary LAN is established between a sender and matched receivers so that data can be transferred between the sender and the matched receivers.

Figure 5:
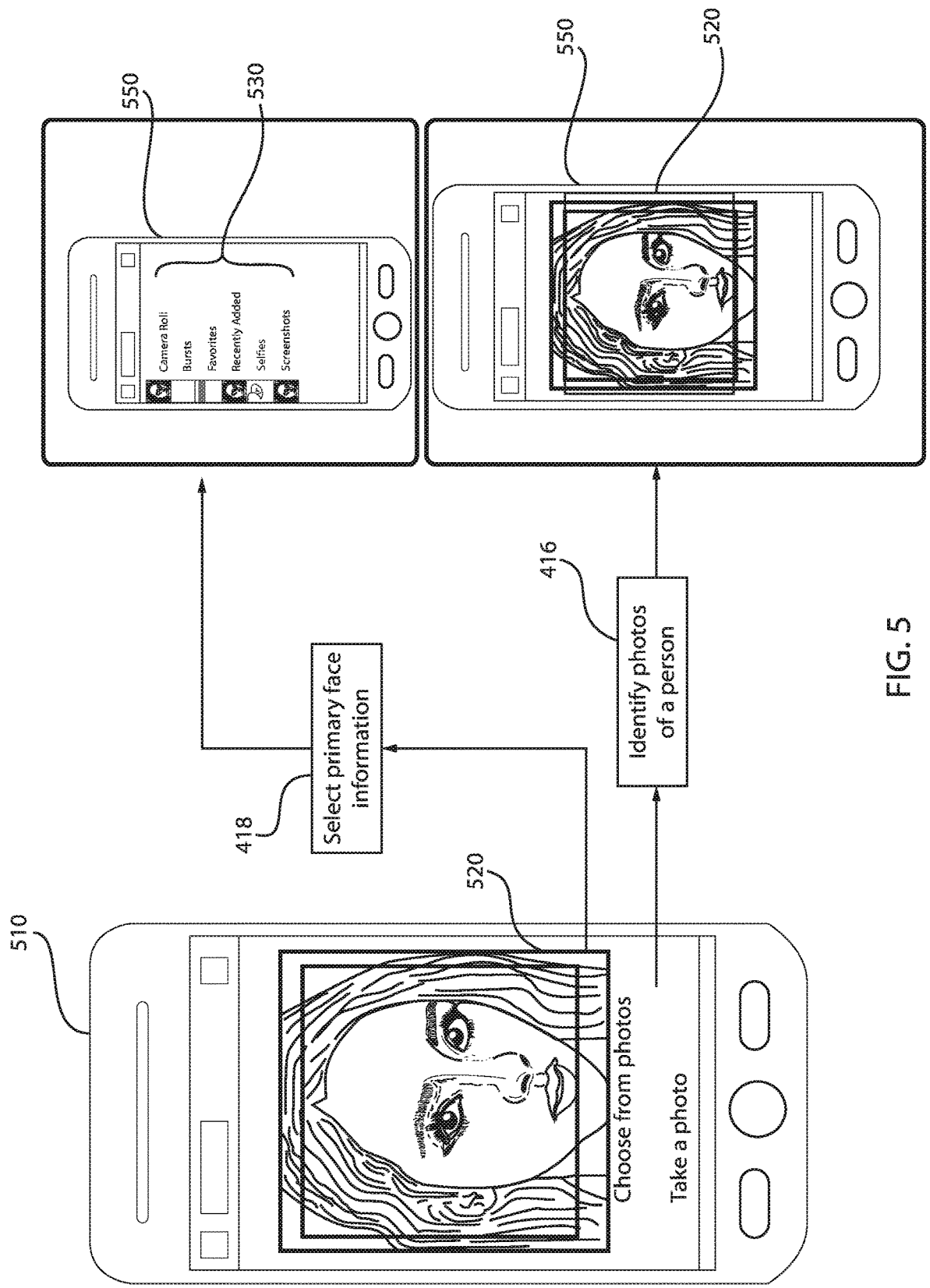
FIG. 5 is a block/flow diagram of an example face feature acquisition system pertaining to photo sharing, in accordance with an embodiment of the present invention.

FIG. 5 is a block/flow diagram of an example face feature acquisition system pertaining to photo sharing, in accordance with an embodiment of the present invention.

A sender (or user) can operate an electronic device, such as a smart phone 510. The user takes a photo 520 of a person. The photo 520 of the person can be transmitted to a plurality of receivers, that is, to a plurality of other electronic devices, such as, smart phones. Thus, the user transmits a broadcast message to the receivers. For example, a receiver 550 can receive the photo 520 of the person. The receiver 550 can identify the photo 520 via an identification module 416 and the receiver 550 can select primary face information from the photo 520 via a face analysis module 418. Thus, the person in the photo 520 is identified and information can be extracted from the photo 520. The information can be stored within one or more folders 530.

In various implementations, the exemplary system can employ either face matching or facial recognition, or both, depending on the particular implementation. In various implementations, face matching need not recognize faces to know they belong to the same person. Face matching (also referred to as face clustering) associates two faces as belonging to the same person, without necessarily identifying who that person is. In various implementations, facial recognition associates an identity (e.g., a name) with a face using existing face templates that have been identified (e.g., named).

In some scenarios, the face in the photo can be similar to multiple reference images associated with the same user. As such, there would be a high probability that the person associated with the face in the photo is the same person associated with the reference images.

In some scenarios, the face in the photo can be similar to multiple reference images associated with different users. As such, there would be a moderately high yet decreased probability that the person in the photo matches any given person associated with the reference images. To handle such a situation, the exemplary system can employ various types of face matching and/or facial recognition algorithms to narrow the possibilities, ideally down to one best candidate.

For example, in some implementations, to facilitate in face matching and/or facial recognition, the exemplary system can employ geometric face matching and/or facial recognition algorithms, which are based on feature discrimination. The exemplary system can also employ photometric algorithms, which are based on a statistical approach that distills a facial feature into values for comparison. A combination of the geometric and photometric approaches could also be used when comparing the face in the photo to one or more references.

Other face matching and/or facial recognition algorithms can be employed. For example, the exemplary system can employ face matching and/or facial recognition algorithms that use one or more of principal component analysis, linear discriminate analysis, elastic bunch graph matching, hidden Markov models, and dynamic link matching. It will be appreciated that the exemplary system can employ other known or later developed face matching and/or facial recognition algorithms, techniques, and/or systems.

In some implementations, the exemplary system can generate an output indicating a likelihood (or probability) that the face in the photo matches a given reference image. In some implementations, the output can be represented as a metric (or numerical value) such as a percentage associated with the confidence that the face in the photo matches a given reference image. For example, a value of 1.0 can represent 100% confidence of a match. This could occur, for example, when compared images are identical or nearly identical. The value could be lower, for example 0.5 when there is a 50% chance of a match. Other types of outputs are possible. For example, in some implementations, the output can be a confidence score for matching.

Figure 6:
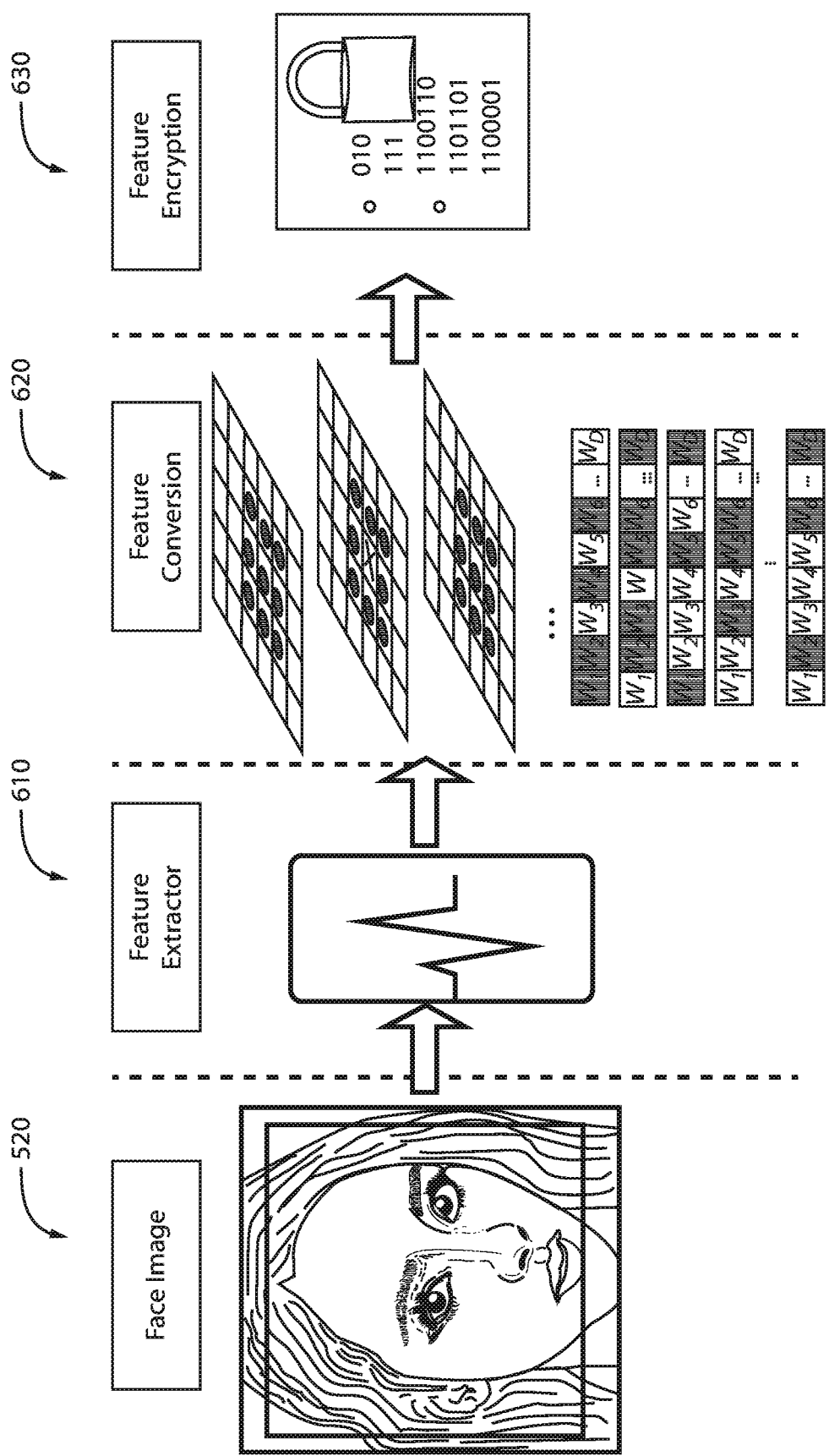
FIG. 6 is a block/flow diagram of an example feature extraction and encryption system pertaining to photo sharing, in accordance with an embodiment of the present invention.

FIG. 6 is a block/flow diagram of an example feature extraction and encryption system pertaining to photo sharing, in accordance with an embodiment of the present invention.

Then feature extraction and encryption can take place. The image or photo 520 can be input into a feature extractor 610 that executes feature conversion 620. The feature information can then be encrypted by a feature encryption module 630.

In general, the exemplary embodiments of the present invention can be applied to deep neural networks. Deep neural network structures can be part of an artificial intelligence module. The artificial intelligence module for example includes an artificial intelligence engine having the functions of: natural language interaction, allowing spoken or written natural language received from a user to be interpreted, and natural language responses to be generated; a dynamic decision module corresponding to the function of making decisions, based on rules, on how to respond to user queries; an interaction memory, storing a history of interactions between a user and a live agent/virtual assistant, for example including messages sent to and from the user; and a behavior analysis function, which can include an algorithm for detecting certain aspects of the interaction with the user, such as emotion, which could indicate when a customer is not satisfied. Thus, a machine learning component can be employed to automatically send photos to one or more users.

As a broad subfield of artificial intelligence, machine learning is concerned with the design and development of algorithms and techniques that allow computers to "learn." At a general level, there are two types of learning: inductive, and deductive. Inductive machine learning methods extract rules and patterns out of massive data sets. The major focus of machine learning research is to extract information from data automatically by computational and statistical methods, hence, machine learning is closely related to data mining and statistics. Embodiments of machine learning can appear in "supervised adaption" and "adaption of algorithms" to evaluate agent performance and assign a score to each agent based on prior performance.

Figure 7:
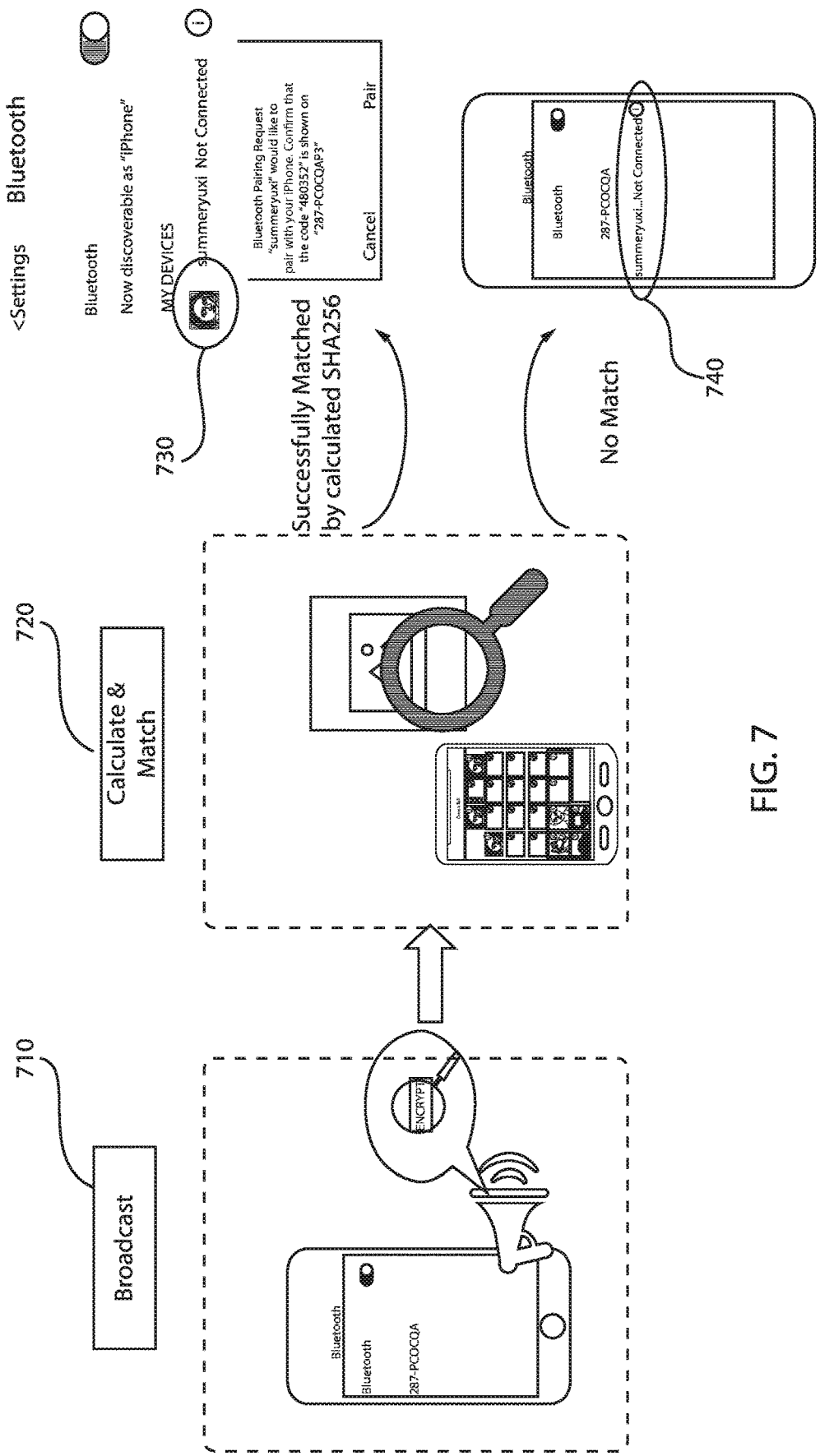
FIG. 7 is a block/flow diagram of an example system for broadcasting facial feature information, in accordance with an embodiment of the present invention.

FIG. 7 is a block/flow diagram of an example system for broadcasting facial feature information, in accordance with an embodiment of the present invention.

The facial feature information can then be broadcast from the smart phone taking the picture or photo. The encrypted facial features or encrypted images can be broadcast 710 to receivers for performing matching operations via a matching module 720. If no match is determined, then the receiver smart phone will display a message 740. If a match is determined, then the receiver smart phone will display a match request or pairing request 730 to automatically share the photo 520.

Figure 8:
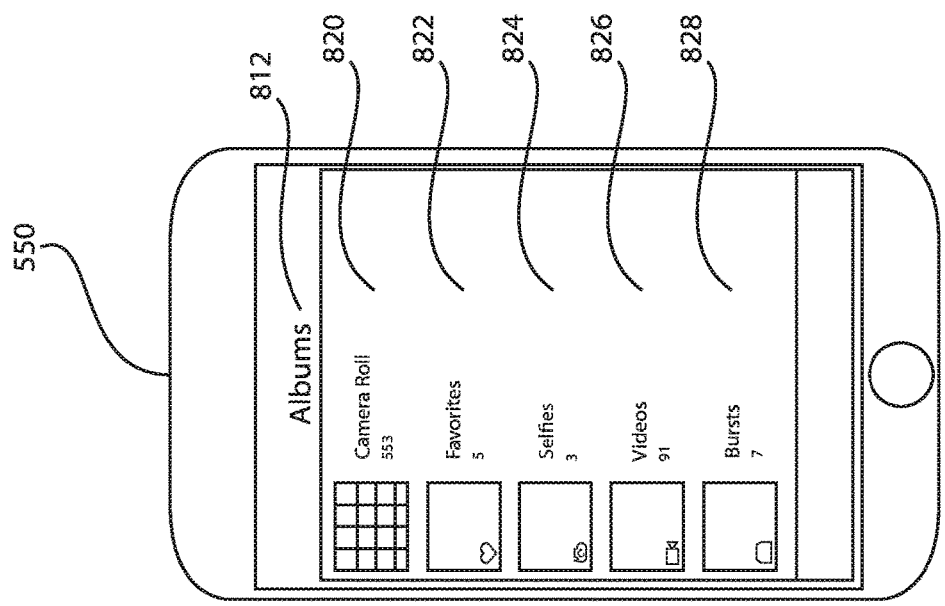
FIG. 8 is a block/flow diagram of an example system for automatically matching photos and transmitting the photos to a destination device associated with the content of the photos, in accordance with an embodiment of the present invention.
Figure 8:
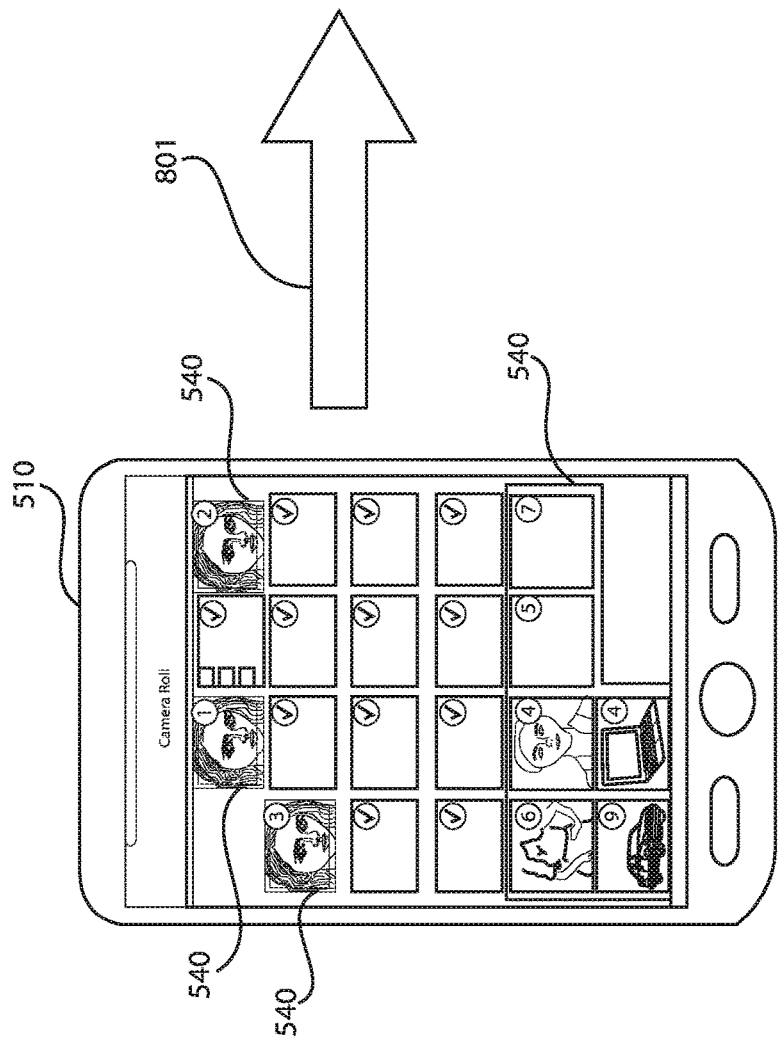

FIG. 8 is a block/flow diagram of an example system for automatically matching photos and transmitting the photos to a destination device associated with the content of the photos, in accordance with an embodiment of the present invention.

When a match is determined, all the photos related to photo 520, that is, related photos 540 are automatically, instantly, and in real-time, transmitted 801 to the receiving device 550. The receiving device 550 can include an album 812 including a plurality of folders for storing the photo 520. For example, the folders can include a cameral roll folder 820, a favorites folder 822, a selfies folder 824, a videos folder 826, and a bursts folder 826. The one or more photos can be distributed to one folder or to a plurality of folders.

In one example, a first person operates a first smart phone. The first person takes one or more photos or pictures with the first smart phone. For example, the first person can take photos of a second person. The second person wishes to obtain such photos taken by the first smart phone operated by the first person. To do so, according to the exemplary embodiments, a temporary local area network (LAN) is set up or established between the first smart phone and the second smart phone. The LAN can be established by Bluetooth® technology. The connection between the first smart phone and the second smart phone can be established after a match has been determined between the first and second smart phones. The match can relate or pertain to ID information, encrypted information, and/or facial features. The methods of the exemplary embodiments then automatically transmit the one or more of the photos taken of the second person by the first person on the first smart phone to the smart phone of the second person. This occurs instantly, automatically, and in real-time. This further occurs without any user intervention.

In another example, a first person operates a first smart phone. The first person takes one or more photos or pictures with the first smart phone. For example, the first person can take photos of a second person, a third person, and a fourth person. The second person, the third person, and the fourth person wish to obtain such photos taken by the first smart phone operated by the first person. To do so, according to the exemplary embodiments, a temporary local area network (LAN) is set up or established between the first smart phone and the smart phones of the second person, the third person, and the fourth person. The LAN can be established by Bluetooth® technology. The connection between the first smart phone and the smart phones of the second, third, and fourth person can be established after a match has been determined between the first smart phone and the rest of the smart phones. The match can relate or pertain to ID information, encrypted information, and/or facial features. For instance, a photo taken by the first person can portray the second, third, and fourth persons. Thus, a broadcast message is transmitted to all the receivers (i.e., the smarts phones of the second, third, and fourth persons). It is assumed that all the receivers are within the vicinity or proximity of the first smart phone of the first person. If a match is determined, then such photo portraying the second, third, and fourth persons is transmitted to the smart phones of each of the second, third, and fourth persons.

The match can be an ID match. For example, the first person could have the phone numbers of the second, third, and fourth persons stored in a phone list of the first smart phone. If so, the broadcast message can be a signal including phone number ID information sent to the smart phones within the vicinity of the first smart phone. The broadcast message can detect the smart phones of the second, third, and fourth persons by the phone numbers associated with the smart phones.

However, the match can also be a facial feature match. For example, the photo taken by the first person can be analyzed to extract the facial features of the second, third, and fourth users. If so, the broadcast message can be a signal including facial feature information related to the second, third, and fourth persons sent to the smart phones within the vicinity of the first smart phone. The broadcast message can detect the smart phones of the second, third, and fourth persons by the facial features associated with the smart phones. For example, the smart phone of the second person can be identified as a match by determining that such smart phone includes a plurality of pictures or photos of the second person or that the profile picture of such smart phone includes the second person. It is also contemplated that a fifth person could have been within the vicinity of the second, third, and fourth person. However, the fifth person was not part of the photo taken by the first person with the first smart phone. The fifth person could have been standing behind the first person. As such, the fifth person's phone is within the vicinity or proximity of the first person's phone. A broadcast message was have also sent to the fifth person's phone. However, no match was determined because the fifth person was not in that photo taken by the first person with the first smart phone. Only the second, third, and fourth persons were in that photo. As a result, a point-to-point LAN was only established between the first smart phone and the smart phones of the second, third, and fourth persons, not the smart phone of the fifth person.

Therefore, one or more receiver information is embedded or incorporated within a broadcast of a sender, meaning that a point-to-point small LAN is setup or established between the one or more receivers and the sender so that data, including images and video, is shared between the sender and the one or more matched receivers. The point-to-point LAN is established only is a match occurs between the one or more receivers and the sender. The match can be, e.g., a phone number match or a facial image match.

In another example embodiment, the matched photos and videos can be automatically transmitted and sorted or organized at the transmitting end or at the receiving end (at the receiving smart phone). For instance, a first person can take, e.g., a first photo portraying the second person, a second photo which is a selfie of the first and second persons, a third photo which is a group photo of the second person with a third person and a fourth person, and a video of the second person. Thus, there are four separate and distinct images or videos. The first person can broadcast a message with such data. At least the smart phone of the second person is detected within the vicinity of the first smart phone of the first person. The second smart phone responds and a match is determined. The first smart phone automatically sorts and labels the four pieces of data, and automatically, and instantly, transmits the four pieces of data in a sequential manner. For example, the first smart phone detects an album named "personal photos" on the second smart phone. The album "personal photos" has a plurality of folders. One folder is named "me photos," another folder is named "my selfies," another folder is named "me videos," and another folder is named "college group photos." The four pieces of data can be prioritized and sequenced to be saved in the proper receiving folders. As a result, the first photo portraying the second person is automatically saved in the "me photos" folder, the second photo which is a selfie photo is automatically saved in the "my selfies" folder, the third photo which is a group photo is automatically saved in the "college group photos," folder, and the video of the second person is automatically saved in the "me videos" folder.

Therefore, the transmission is not a dump of data onto the second device without any rhyme or reason. Instead, the data is transmitted from the sender (first smart phone) to the receiver (second smart phone) in an organized manner where the data is sorted by content information within the photos or videos taken. The content of each photo (or image) or video is evaluated or analyzed to send the data to the correct folders on the receiver side (instead of dumping all the data in one location). The data generated by the sender can thus be saved in multiple locations within the mobile device of the receiver.

Also, the images taken can be sorted and organized at the transmitting end. For example, once the matched second computing devices are determined, the plurality of images created by the first computing device are automatically sorted and organized before being transmitted to the matched second computing devices. In one instance, photos are taken of a third person and a fourth person by the first computing device of the first person. If a LAN is established between the first computing device and the computing devices of the third and fourth persons, then the images can be sorted or organized before being transmitted to the computing devices of the third and fourth persons. Say, the first person uses the first computing device to take 2 photos of the third person and 2 photos of the fourth person, and 1 photo of both the third and fourth persons. The images can be sorted or organized or separated before being transmitted to the computing devices of the third and fourth persons. The 2 photos of the third person can be prioritized and sequenced to be transmitted first, the 2 photos of the fourth person can be sequenced and transmitted after the two photos of the third person are sent ($2^{nd}$ priority), and the single photo with both the third and fourth persons can be sent last (3$^{rd}$ priority). Of course, further sorting and organizing can then occur at the receiver side. For instance, once the third person receives the 2 photos of himself/herself, such 1 photos can be sorted, e.g., into different folders within an album. One photo can be automatically saved in a first folder and the other photo can be automatically saved in a second folder, either within a single album or in different albums. The receiver can designate such settings beforehand.

In various exemplary embodiments, when the data is transmitted from the sender to the receiver, the receiver mobile device receives a notification that data transfer has occurred and was successful. Additionally, the notification can indicate in which folders the data has been saved.

According to certain implementations, photos transferred to a user or computer can be marked as "shared" photos. All photos that have not been shared can be considered "unshared" photos. Thus, the first mobile device can designate which photos were shared and with which users such photos were shared. Such shared photos can be designated as shared by an indicator associated with each shared photo. The indicator can be, e.g., a checkmark or a highlighted box around the photo or a letter "S" at a corner of the photo. Additionally, the second mobile device of the second person receiving the shared photos can provide indicators to the second person for indicating which photos were sent and by whom. A first set of shared photos can be designated by a first marker or indicator, whereas a second set of photos can be designated by a second marker or indicator, different than the first indicator. Thus, if the second person attends a party and multiple people take photos of the second person, the second person would receive shared photos from multiple users. The photos received from a third user could be designated with one label in the folders of the mobile device of the second user, the photos received from a fourth user could be designated with another label in the folders of the mobile device of the second user, the photos received from a fifth user could be designated with another label in the folders of the mobile device of the second user, etc. As such, the second user can determine and identify all the users that sent photos to the second mobile device, as well as which photos were sent by each user.

In another exemplary embodiment, the photos taken by a first person operating a first mobile device can be automatically transmitted to the second person, assuming the photos are of the second person, and the second person can set an automatic setting where such shared photos are instantly and automatically uploaded to a social network.

Consequently, data, such as images or videos, are transmitted automatically and instantly, directly between electronic devices without the need for servers or external storage devices. Thus, mobile devices directly communicate with each other to establish local LAN networks to share data.

The advantages of the exemplary embodiments include at least an easy and flexible way to share photos between users, without requiring a server, enhanced security and privacy between the electronic devices of the users, no need to employ any server or storage devices, cross-validation techniques for improving accuracy, and simplified methods for determining whose Bluetooth® device to send the photos or images by employing photo matching techniques.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a system and method for instantly sharing photos or images between users (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method executed on a processor for enabling instant and automatic photo sharing between computing devices, the computer-implemented method comprising:
   allowing a first user to operate a sender to create a plurality of images, the plurality of images including physical characteristics of a second user;
   transmitting a broadcast message to a plurality of receivers;
   determining whether a match occurs between the sender and one or more of the plurality of receivers;
   establishing a local area network between the sender and matched receivers;
   automatically and instantly transmitting the plurality of images to the matched receivers by calculating priority from the matched receivers and by calculating sequence determinations for the matched receivers resulting from the calculated priority; and
   upon completion of the transmittal of the plurality of images to the matched receivers, terminating the local area network.

2. The method of claim 1, wherein the match is determined based on mobile number identification information.

3. The method of claim 1, wherein the match is determined based on facial feature information.

4. The method of claim 3, wherein the facial feature information is encrypted.

5. The method of claim 1, wherein the priority and sequence determinations are based on at least response time, data size, and transmission data rates.

6. The method of claim 1, wherein, once the matched receivers are determined, the plurality of images created by the sender are automatically sorted and organized before being transmitted to the matched receivers.

7. The method of claim 6, wherein, after the matched receivers receive their corresponding images from the plurality of images, the corresponding images are further sorted and automatically stored in one or more predetermined locations within their respective matched receivers.

8. A non-transitory computer-readable storage medium comprising a computer-readable program executed on a processor in a data processing system for enabling instant and automatic photo sharing between computing devices, wherein the computer-readable program when executed on the processor causes a computer to perform the steps of:
 allowing a first user to operate a sender to create a plurality of images, the plurality of images including physical characteristics of a second user;
 transmitting a broadcast message to a plurality of receivers;
 determining whether a match occurs between the sender and one or more of the plurality of receivers;
 establishing a local area network between the sender and matched receivers;
 automatically and instantly transmitting the plurality of images to the matched receivers by calculating priority from the matched receivers and by calculating sequence determinations for the matched receivers resulting from the calculated priority; and
 upon completion of the transmittal of the plurality of images to the matched receivers, terminating the local area network.

9. The non-transitory computer-readable storage medium of claim 8, wherein the match is determined based on mobile number identification information.

10. The non-transitory computer-readable storage medium of claim 8, wherein the match is determined based on facial feature information.

11. The non-transitory computer-readable storage medium of claim 10, wherein the facial feature information is encrypted.

12. The non-transitory computer-readable storage medium of claim 8, wherein the priority and sequence determinations are based on at least response time, data size, and transmission data rates.

13. The non-transitory computer-readable storage medium of claim 8, wherein, once the matched receivers are determined, the plurality of images created by the sender are automatically sorted and organized before being transmitted to the matched receivers.

14. The non-transitory computer-readable storage medium of claim 13, wherein, after the matched receivers receive their corresponding images from the plurality of images, the corresponding images are further sorted and automatically stored in one or more predetermined locations within their respective matched receivers.

15. A system for enabling instant and automatic photo sharing between computing devices, the system comprising:
 a sender operated by a first user to create a plurality of images, the plurality of images including physical characteristics of a second user;
 a plurality of receivers to receive a broadcast message transmitted from the sender, wherein each of the plurality of receivers determines whether a match occurs between the sender and one or more of the plurality of receivers; and
 a local area network established between the sender and matched receivers;
 wherein the plurality of images are automatically and instantly transmitted to the matched receivers by calculating priority from the matched receivers and by calculating sequence determinations for the matched receivers resulting from the calculated priority, and, upon completion of the transmittal of the plurality of images to the matched receivers, the local area network is terminated.

16. The system of claim 15, wherein the match is determined based on mobile number identification information.

17. The system of claim 15, wherein the match is determined based on facial feature information.

18. The system of claim 17, wherein the facial feature information is encrypted.

19. The system of claim 15, wherein the priority and sequence determinations are based on at least response time, data size, and transmission data rates.

20. The system of claim 15, wherein, once the matched receivers are determined, the plurality of images created by the sender are automatically sorted and organized before being transmitted to the matched receivers.

* * * * *